(12) United States Patent
Chengalvarayan (10) Patent No.: US 9,620,106 B2
(45) Date of Patent: Apr. 11, 2017

(54) SYSTEM AND METHOD FOR PERSONALIZATION IN SPEECH RECOGNITON (71) Applicant: AT&T Intellectual Property I, L.P., Atlanta, GA (US)

(72) Inventor: Rathinavelu Chengalvarayan, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/446,441

(22) Filed: Jul. 30, 2014

(65) Prior Publication Data

US 2016/0035346 A1    Feb. 4, 2016

(51) Int. Cl.
G10L 21/00    (2013.01)
G10L 15/00    (2013.01)
G10L 15/07    (2013.01)
G10L 15/22    (2006.01)
G10L 17/00    (2013.01)

(52) U.S. Cl.
CPC .............. *G10L 15/07* (2013.01); *G10L 15/22* (2013.01); *G10L 17/00* (2013.01); *G10L 2015/226* (2013.01)

(58) Field of Classification Search
None
See application file for complete search history.

(56) References Cited

U.S. PATENT DOCUMENTS

| 6,434,524 | B1 | 8/2002 | Weber |
| 6,446,076 | B1 | 9/2002 | Burkey et al. |
| 6,731,334 | B1 * | 5/2004 | Maeng .................. G01S 3/7864 348/14.08 |
| 6,832,189 | B1 * | 12/2004 | Kanevsky ............... G10L 15/07 704/235 |
| RE39,090 | E | 5/2006 | Beauregard et al. |
| 7,333,933 | B2 | 2/2008 | Brennan et al. |
| 7,516,072 | B2 * | 4/2009 | Campbell .......... B60R 16/0373 381/86 |
| 8,015,014 | B2 | 9/2011 | Wang et al. |
| 8,606,581 | B1 * | 12/2013 | Quast ...................... G10L 15/32 704/254 |
| 2003/0004720 | A1 * | 1/2003 | Garudadri ............... G10L 15/30 704/247 |
| 2007/0185718 | A1 * | 8/2007 | Di Mambro ............ G06F 21/32 704/273 |

(Continued)

OTHER PUBLICATIONS

Gomez, Randy, and Tatsuya Kawahara, "Optimized Wavelet-based Speech Enhancement for Speech Recognition in Noisy and Reverberant Conditions," *Proc. APSIPA ASC*, 2011.

*Primary Examiner* — Marcus T Riley (57) ABSTRACT

Systems, methods, and computer-readable storage devices are for identifying a user profile for speech recognition. The user profile is selected from one of several user profiles which are all associated with a speaker, and can be selected based on the identity of the speaker, the location of the speaker, the device the speaker is using, or other relevant parameters. Such parameters can be hierarchical, having multiple layers, and can also be dependent or independent from one another. Using the parameters identified, the user profile is selected and used to recognize speech.

20 Claims, 3 Drawing Sheets (56) References Cited

U.S. PATENT DOCUMENTS

| | | | |
|---|---|---|---|
| 2008/0300871 A1* | 12/2008 | Gilbert | G10L 15/20 704/233 |
| 2010/0049516 A1* | 2/2010 | Talwar | G10L 15/07 704/251 |
| 2010/0112991 A1* | 5/2010 | Hannaby | H04M 1/2155 455/414.3 |
| 2010/0121636 A1* | 5/2010 | Burke | G06F 3/0346 704/233 |
| 2010/0312556 A1* | 12/2010 | Ljolje | G10L 15/07 704/244 |
| 2011/0191106 A1 | 8/2011 | Khor et al. | |
| 2013/0211815 A1 | 8/2013 | Seligman et al. | |

* cited by examiner

SYSTEM AND METHOD FOR PERSONALIZATION IN SPEECH RECOGNITON

BACKGROUND

1. Technical Field

The present disclosure relates to speech recognition and more specifically to improving speech recognition by using speaker-specific speech profiles.

2. Introduction

Speech recognition is often performed using a single profile for multiple users. For example, the speech recognition system will attempt to recognize speech from an older man in New York using the same grammar, lexicon, and sound normalization algorithms used for a teenage girl in California. Similarly, a common speech recognition configuration is commonly used regardless of location, the acoustics of the location, microphone/capture device being used to receive the speech, accents of people speaking, etc.

DETAILED DESCRIPTION

A system, method and computer-readable storage devices are disclosed which provide for personalization of speech recognition using a variety of parameters, which can have various layers and/or dependencies. As an example, the system identifies a speaker, along with any known details of the speaker, such as accent, age, demographic, socio-economic status, profession, etc. The speaker identity can form a first hierarchical structure, where the identity of the speaker has a level of detail, or hierarchy, determined by the system.

The system then determines a current location of the speaker, which is a second parameter. The location parameter can be independent of the first structure or dependent on the speaker identity (thereby forming an integrated hierarchy by combining two distinct hierarchies, the profile and the location hierarchies). This current location can also have various levels of detail. For example, if the speaker is in a park in Manhattan, the current location could be identified as "park," "Central Park," or "Central Park, Manhattan." If the specific location within the park is known, the current location could be "tunnel, Central Park, Manhattan" or "row boats, Central Park, Manhattan." Likewise, if a speaker is at home, the level of detail can be specific to inside or outside, what room the speaker is in, details about the room, such as the type of flooring, how large of a room it is, details about the acoustics of the room, etc.

The system then identifies the microphone or capture device being used to record the speech of the speaker. Device specific information, such as the microphone, can form a third hierarchical structure, and can be dependent on the previous hierarchies identified, or can be independent of those structures. Exemplary device specific information can include the brand or type of microphone, sampling information, the number of microphones (e.g., a single microphone or a microphone array), versions of software being used, versions of hardware being used, etc. While the specific microphone used to record speech can be one point of data for this hierarchical structure, additional data which can be identified in conjunction with device specific information can be sampling rate, the range of detectable frequencies, and/or any information related to the quality of the recorded speech.

Having identified specific parameters associated with the speaker, the system selects a user profile 208 from a plurality of user profiles based on the speaker identity, the current speaker location, and the microphone type, where each of the plurality of speaker profiles is associated with the speaker. That is, rather than selecting a generic speech recognition profile based on the various details identified, the speech recognition profile is selected from one of several speaker specific profiles based on the user identity, the speaker's current location, and the microphone type. The system then performs speech recognition on the speech, and future speech, received from the user using the user profile.

As an example, the speech recognition system can create three different profiles for a single speaker, depending on the sampling rate of audio streaming from the invoking device. For example, a landline telephone might use 8 kHz sampling, a smartphone might use 16 kHz sampling, and a recording studio might use 22 kHz (or higher) sampling. Once the speaker-specific profiles are created, the system can invoke the particular profile when the user uses the particular device during speech-enabled interactions.

In this way, the system can dynamically create, identify, and/or use multiple profiles for individual speakers based on the specific circumstances surrounding the speaker, such as the location from where they are speaking and by what device the speaker is using to communicate. The user profile can store speaker-specific parameters, such as vtln-warp factors, cma-matrices, pitch, gender, age, location, etc., which the system can use without additional user guidance (that is, automatically, or via a processor) to pick the optimal speaker profile among multiple profiles associated with the speaker. The system, having selected the best speaker profile for the circumstances, provides speech recognition results to initiate further action(s). The specific parameters, which can have independent/dependent hierarchies as described herein, are updated based on the current speech recognition session data and can update the user profiles.

The present disclosure addresses personalization of speech. Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of personalized speech recognition will then follow, accompanied by multiple examples and variations. These variations shall be described herein as the various embodiments are set forth. The disclosure now turns to FIG. 1.

Figure 1:
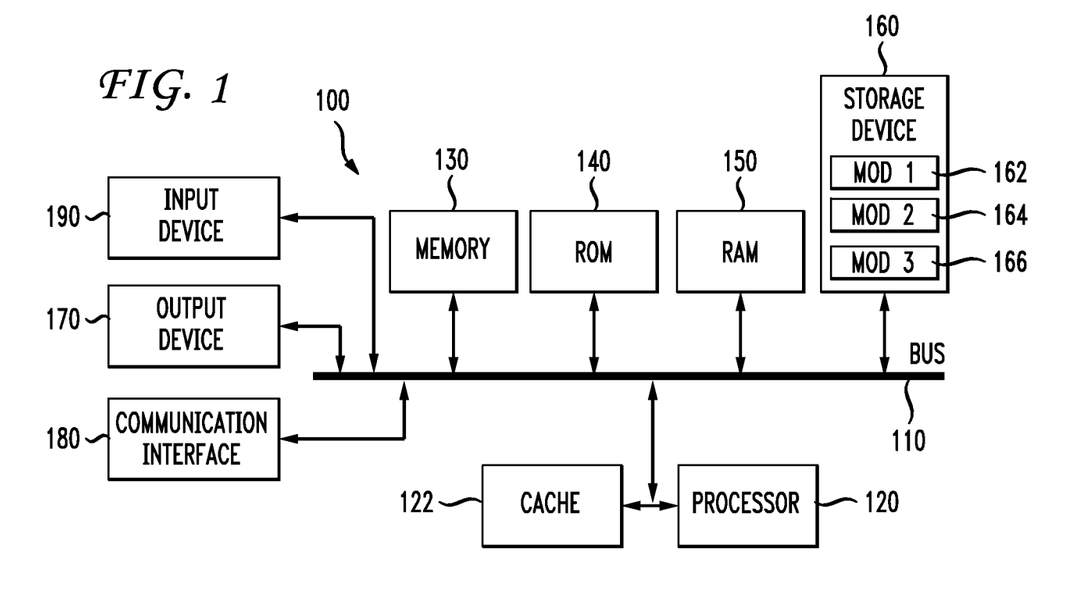
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1

162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
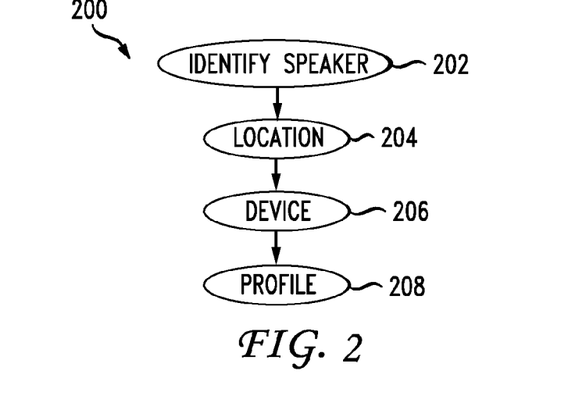
FIG. 2 illustrates an exemplary set of parameters.

Having disclosed some components of a computing system, the disclosure now turns to FIG. 2, which illustrates exemplary set of parameters 200. As illustrated, each parameter in the set 200 is tied to various pieces of data used to eventually select a profile 208. The system first identifies the speaker 202, then identifies the current location of the speaker 204, identifies the device used for receiving speech 206, and subsequently selects the user profile from multiple user profiles associated with the speaker.

Each of the parameters can be independent or can be dependent on the other parameters. As illustrated in FIG. 2, each parameter is dependent upon the others. For example, the current location 204 cannot be identified until the identity of the speaker 202 is determined. Likewise, the specifics of the device 206 cannot be determined until the current location 204 is determined. In a dependent configuration, each parameter is narrowing the total number of speaker specific user profiles which could be selected as "the user profile" appropriate for use in recognizing speech from the user at that time. Thus, for example, upon identifying the speaker, speech recognition configurations not specific to the speaker will be eliminated from possibly being the user profile used for speech recognition. One can think of such a system as narrowing the pool of candidate user profiles as additional data is received. As another example, if the speaker is found to be using a specific accent at time of use, user profiles associated with distinct accents will be removed from contention as the appropriate user profile.

Once the speaker identity 202 is known, the location 204 can similarly eliminate other user profiles from the candidate user profiles, as can information associated with the device 206 or other parameters. Eventually, the system identifies a user profile 208 which fits the known information, and which is specific to the user, and uses that user profile to recognize the speech and/or additional future speech.

In an independent configuration, the parameters of one group are not eliminated based on information related to a parameter of another group. For example, in a dependent configuration, the location parameter 204 or the speaker identity parameter 202 might eliminate possible device types (perhaps certain types of devices are not in service in specific locations, or a user has an aversion to a particular brand). In the independent configuration, no such restriction or elimination occurs, with each parameter being identified independently.

Each of the parameters 202, 204, 206 can have their own hierarchy, or level of detail. For example, the speaker identity can have a broad classification of the speaker, such as a profession, demographic, socio-economic level, or level of education. Beneath the broad classification can be additional identifying information which identifies the specific, individual, identity of the speaker. Thus, while a speaker might be a "Police Officer," the speaker is also "Police Officer, James Brown." Additional information about the speaker can be included in the speaker identity hierarchy, such as age, education, accent, speech deformities/abnormalities, etc.

For location, the system can determine the location using a global positioning system receiver (GPS receiver), triangulation services, or the information can be entered by a user. The broad classification could be "home" or a "house", followed by what specific room the speaker is in, followed even further by the specific acoustics of that room. Other locations could focus on neighborhoods, buildings, rooms within buildings, transportation means (i.e., train, car, bicycle, motorcycle), etc. The acoustics of the identified location can be determined by a device associated with the speaker or by the speaker answering specific questions about the acoustics. If the device determines the acoustics, acoustic measurements can be performed by the user walking or pointing a device (such as a smartphone) or microphone around the room as the device tests and records noise reduction, echoing, and other acoustic features. Alternatively, the user could enter information about a room via a user interface screen. The user interface screen could be a list of fields where the user can enter information, or the user interface could prompt the user to answer specific questions which the system uses to determine acoustics of the room (for example, is there a couch? is there carpet? how high is the ceiling?)

In addition to the parameters of speaker identity 202, location 204, and device 206, additional parameters can be used to determine which user profile 208 to use in speech recognition. Additional parameters can include time of day, the location where they initiate the call (as opposed to a current location), speaking style (work, home, jovial, professional, etc.), movement/direction of travel, rate of travel, user history, accent of a second person, how long since the speaker last slept, how fast the accent of the speaker has changed when away from home, how fast the accent of the speaker has changed when speaking with people having specific accents, identified sources of anxiety (the speaker doesn't like planes, the speaker doesn't like zoos), activity currently being performed by the speaker (i.e., jogging, ice skating, bowling, treadmill), and/or the length of speech being processed.

As a further example regarding alternative parameters, the length of the spoken utterance or speech being processed can determine what type of speech recognition is performed. Thus, for a short command the system will run with only 1-pass speech recognition to obtain a faster response, whereas if the user is compiling a voicemail then the system will run a full 3-pass recognition to obtain more accurate results. Exemplary models for a 1-pass, 2-pass, and 3-pass system include 1-pass meaning base speech recognition models, 2-pass meaning using VTLN (Vocal Tract Length Normalization) warped models, and 3-pass meaning using constrained-model adaptation models.

Thus, the illustrated parameters 202, 204, 206 are exemplary only. Other configurations will use additional parameters with, or in place of, the illustrated parameters. For example, in one embodiment the system does not rely on location data, instead relying on a rate of travel. In another embodiment, device data is ignored while additional parameters are added. In yet another configuration, the specific parameters required is dynamic, shifting upon needing additional information to clarify which user profile should be used in the current situation. Thus if the user profile to be used is identified based on the speaker identity 202 and the current location 204, no device information 206 may be required. Alternatively, if, after receiving the speaker identity 202, the current location 204, and the device information 206, additional information is required to select the best user profile for the speech being received, the system can add a parameter "on the fly," then use the added parameter to select the appropriate user profile.

Figure 3:
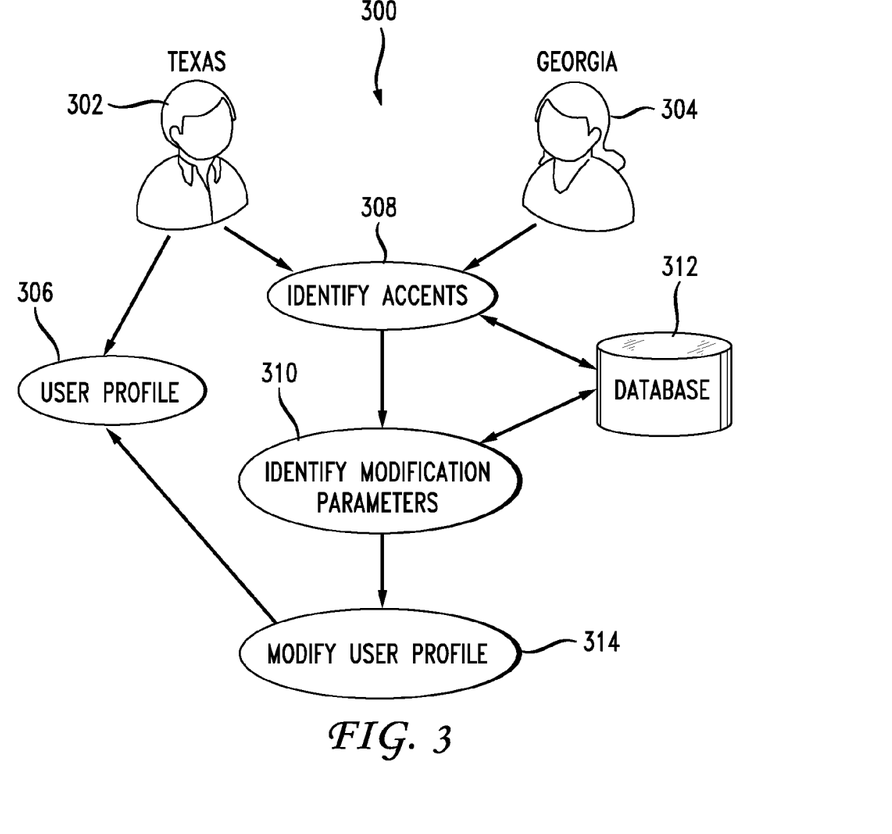
FIG. 3 illustrates an exemplary modification based on detected parameters.

FIG. 3 illustrates an exemplary modification based on detected parameters. In this example 300, a profile 306 of a first user 302 is modified based on the accent of the second user 304. However, in other examples, the user profile selected could change based on a change in location (for example, if the user moves from the garage to the kitchen) or changed device capabilities, or based on the availability/unavailability of other parameters being used by the system.

Considering the illustrated example 300 of a user profile 306 changing based on the accent of a second user, the first user 302 happens to have a Texas accent while the second user 304 has a Georgia accent. These accents are chosen simply as exemplary accents. The system identifies the accents of the users 308 and compares the identified information to recorded information in a database 312. For example, the database 312 may have information noting that the first user always mirrors the accent of the second user at an identified rate which changes based on the time of day. Thus, early in the morning the Texas user 302 quickly adopts the accent of whomever they are speaking with, and later in the day the Texas user 302 still changes accent, but at a slower rate. The database 312 also notes that whenever the Texas user 302 is driving to Georgia, the accent changes at a variable rate based on how close the user is to Georgia, however, when the Texas user is driving to California, such change in accent is dramatically reduced. The change rates, the degrees of variations between user profiles, and other information can be recoded in the database 312 and used by the system to identify modification parameters 310. Thus the system, when those modification parameters are met, and modify the user profile 314, 306 being used, or alternatively, can select a different user specific profile from the user specific profiles created.

In the illustrated example 300, the database notes that for every 5 minutes the Texas speaker 302 is on the phone with the Georgia speaker 304, the accent (measured by pitch and/or prosody) of the Texas speaker 302 changes to an nth degree. Based on the iterative changes, the system selects a distinct user-specific profile every 5 minutes or modifies the user profile 314 every 5 minutes. In instances where the rate of change might not be known, the system can continue to probe or acquire data which can be used to determine if modification, or selection of a distinct profile, needs to occur. For example, the system might probe GPS coordinates periodically to determine if a change in location has occurred. Exemplary time periods can include every 30 seconds, every minute, every 5 minutes, every hour. The database 312 can include information which defines the probe period. For example, if the user is at home every night between 9 pm and 10 pm, speech recognition during that time might not require as frequent probing of the GPS. Likewise, if a specific user profile is constantly used when the user is at a specific location (i.e., at work), probing of additional parameters (such as device characteristics) can be less frequent.

Various parameters, such as device characteristics, may only be required to be probed a single time. For example, once the user identity is confirmed, or a device being used for a session is identified, no additional probing may be required. However, in other circumstances probing may be necessary. For example, if the system notes distinct vocal patterns, identifying an identity of the speaker may need to be performed again. If various device capabilities are only possible on a wireless (Wi-Fi) connection, and the user moves to a telephone connection or otherwise loses wireless connection, the specific device parameters may need to be re-identified. Each system can be configured to identify threshold values for when a change has occurred and when a parameter needs to be re-identified, and a new user profile selected.

Figure 4:
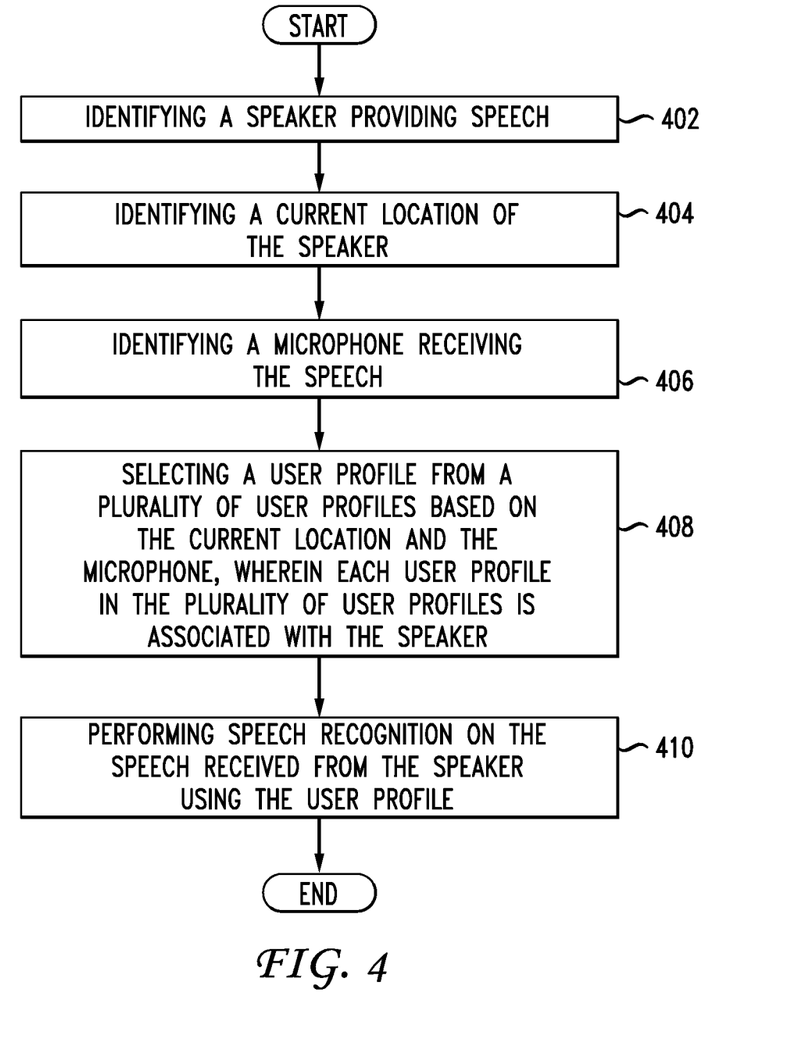
FIG. 4 illustrates an example method embodiment.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 identifies a speaker providing speech (402). Identification of the speaker can occur based on biometric recognition (such as identifying a voiceprint, fingerprint, facial recognition, etc.), identifying the phone of the speaker, identifying a computer of the speaker, prompting the user for identification, or any other means for singling out the identity of the speaker. The speaker identification can have varied level of detail, including information about the user (name, profession, education, home, place of birth, current residence, socio-economic status, preferred language, and/or accent), or can only include the name or identification of the speaker.

The system 100 also identifies a current location of the speaker (404). Identifying the current location of the speaker can utilize GPS, triangulation, wireless, prompting the user, or any other required data. The current location can have additional information associated with it, such as the acoustics of specific locations identified. Alternatively or in addition, the system 100 can identify the acoustics of the current location, and use the specific acoustics of the location to select a user profile. Also, various embodiments can request the speaker (or another user) enter specific information about parameters such as location. For example, the system 100 can ask what furniture you have in a particular room, distance from the microphone, etc. This data, which can be also detected automatically via sensors, can provide gammatone cepstral coefficients (GCC) and damped oscillator cepstral coefficients (DOCC) which can be used as speech features with corresponding acoustic models for speech recognition. Embodiments which utilize such data can, instead of or in addition to automatically measuring the data, can directly query the speaker via a spoken prompt or written message (email, text, etc.). If the speaker responds using his/her voice, the system 100 can further use the spoken query response to determine the location and/or other parameters.

The system 100 identifies a microphone or other device receiving the speech (406). This device specific information can include the microphone type, a sampling rate, information about what filters (low-pass, high-pass, band-pass) are used, what frequency ranges are sampled, what software is being used to perform the speech recognition, what other information is required, etc.

The speaker identity, location, and device parameters can be hierarchical. For example, the level of detail associated with each parameter can vary based on the specific needs and circumstances of each embodiment. If an embodiment does not need much detail, the configuration may not require detailed information, whereas other configuration or embodiments can require very specific details. Exemplary level of details for a location can include general descriptions, such as home, park, work, city or state; more detailed descriptions such as a particular room in a home, the name of a park, a particular section of the park (playground versus nature trail), a particular floor and/or room in a building (use of an altimeter can be used in conjunction with a GPS to determine the floor/room combination); while very detailed descriptions can include noise profiles (i.e., constant banging, loud children, heavy traffic), acoustic profiles (for example, how the sound echoes or carries in the room), other noise sources in the room, etc.

The various parameters can depend from one another or can be independent of one another. If independent of one another, the system 100 identifies each parameter separately from other parameters. If dependent from one another, the system 100 can exclude various "downstream" parameters after any given parameter, or parameter hierarchy, is received. For example, if the parameters being used by the system 100 are speaker identity, followed by location, followed by device, the identity of the speaker can result in various locations and/or devices being excluded. A subsequent identification of the location which is allowable based on the speaker identity could further exclude various devices. Likewise, if the system 100 were using a time-of-day parameter, followed by a speaker identity, followed by a device, the time-of-day could exclude various speaker identities from being identified and various devices from being selected.

The system 100 selects a user profile from a plurality of user profiles based on the current location and the microphone, wherein each of the user profiles in the plurality of user profiles is associated with the speaker (408). When the system uses other parameters in addition to, or in place of, speaker identity, location, and device parameters, the other parameters can also be used to identify the user profile. If the speaker's identity is not used as a parameter, two possible configurations are (1) all of the profiles are associated with a single speaker or (2) the parameters being used identify the speaker and the speaker's plurality of user profiles which are stored in the system 100. In addition, in other variations the plurality of speaker profiles can be specific to the speaker (that is, they are only used by the speaker) or can be associated with a class, categorization, or organization to which the speaker corresponds. For example, if a specific set of speaker profiles is associated with travel agents, and the speaker is a travel agent, the user profile selected may be specific to travel agents. Preferably, the user profile selected is specific to the individual using the system 100, in which case all the profiles of the system 100 are associated with a single speaker. Similarly, the user profiles can be specific to a location, device, or other parameter, in addition to, or in place of, the user profiles being specific to an identified speaker. For example, a given user profile can be specific to a unique location (i.e., the Sydney Opera House).

Once the system 100 has retrieved the user profile, the system performs speech recognition on the speech received from the speaker using the user profile (410). The system 100 can also use the user profile to recognize future speech, received at a later time, using the user profile. In such configurations, the time period before the system 100 begins the process can be directly based on the parameters used. For example, if a parameter, such as location, has shown a correlation with consistently using a single user profile for an extended period of time, the system 100 can recognize the correlation and postpone or delay re-identifying parameters for a specific period of time based on the correlating parameters. Likewise, if various parameters indicate an increased risk that the user profile will not be the most effective user profile for an extended amount of time, the system 100 can re-initiate identification of the parameters earlier than usual. In such configurations, the system 100 can therefore establish a normal timeframe for repeating the identification of parameters and modify and/or change the timeframe based on the parameters detected.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to selection of a speaker-specific sound profile for both personal computers and mobile communication instruments such as tablets and phones. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A method comprising:
   identifying a speaker providing speech;
   identifying a microphone type of a microphone receiving the speech;
   selecting a user profile from a plurality of user profiles based on the microphone type and a current location of the speaker, wherein each user profile in the plurality of user profiles is associated with the speaker; and
   performing, via a processor, speech recognition on the speech received from the speaker using the user profile.

2. The method of claim 1, wherein the user profile is specific to acoustics of the current location of the speaker.

3. The method of claim 1, wherein the selecting of the user profile is further based on a recipient profile associated with a recipient of the speech.

4. The method of claim 1, further comprising modifying an aspect of the speech recognition based on a speech adaption associated with the speaker.

5. The method of claim 4, wherein the speech adaptation is an accent change.

6. The method of claim 1, further comprising presenting a query to a user, wherein the query presented to the user comprises a request regarding acoustics in a current location of the speaker.

7. The method of claim 1, further comprising generating a sound profile for a current location of the speaker based on a number of microphones within a threshold distance from the speaker.

8. The method of claim 1, wherein the speech recognition comprises a multi-pass recognition.

9. A system comprising:
   a processor; and
   a computer-readable storage medium having instructions stored which, when executed by the processor, cause the processor to perform operations comprising:
   identifying a speaker providing speech;
   identifying a microphone type of a microphone receiving the speech;
   selecting a user profile from a plurality of user profiles based on the microphone type and a current location of the speaker, wherein each user profile in the plurality of user profiles is associated with the speaker; and
   performing speech recognition on the speech received from the speaker using the user profile.

10. The system of claim 9, wherein the user profile is specific to acoustics of the current location of the speaker.

11. The system of claim 9, wherein the selecting of the user profile is further based on a recipient profile associated with a recipient of the speech.

12. The system of claim 11, the computer-readable storage medium having additional instructions stored which, when executed by the processor, cause the processor to perform an operation comprising modifying an aspect of the speech recognition based on a speech adaption associated with the speaker.

13. The system of claim 12, wherein the speech adaptation is an accent change.

14. The system of claim 9, the computer-readable storage medium having additional instructions stored which, when executed by the processor, cause the processor to perform an operation comprising presenting a query to a user, wherein the query presented to the user comprises a request regarding acoustics in a current location of the speaker.

15. The system of claim 9, the computer-readable storage medium having additional instructions stored which, when executed by the processor, cause the processor to perform an operation comprising generating a sound profile for a current location of the speaker based on a number of microphones within a threshold distance from the speaker.

16. The system of claim 9, wherein the speech recognition comprises a multi-pass recognition.

17. A computer-readable storage device having instructions stored which, when executed by a computing device, cause the computing device to perform operations comprising:
   identifying a speaker providing speech;
   identifying a microphone type of a microphone receiving the speech;
   selecting a user profile from a plurality of user profiles based on the microphone type and a current location of the speaker, wherein each user profile in the plurality of user profiles is associated with the speaker; and
   performing speech recognition on the speech received from the speaker using the user profile.

18. The computer-readable storage device of claim 17, wherein the user profile is specific to acoustics of the current location of the speaker.

19. The computer-readable storage device of claim 17, wherein the selecting of the user profile is further based on a recipient profile associated with a recipient of the speech.

20. The computer-readable storage device of claim 19, having additional instructions stored which, when executed by the computing device, cause the computing device to perform operations comprising modifying an aspect of the speech recognition based on a speech adaption associated with the speaker.

* * * * *